United States Patent

Jalics

[11] Patent Number: 4,647,634
[45] Date of Patent: Mar. 3, 1987

[54] RANDOMIZERS FOR USE IN SOLUTION POLYMERIZATIONS
[75] Inventor: George Jalics, Akron, Ohio
[73] Assignee: The Goodyear Tire & Rubber Company, Akron, Ohio
[21] Appl. No.: 837,630
[22] Filed: Mar. 10, 1986
[51] Int. Cl.⁴ .............................................. C08F 4/08
[52] U.S. Cl. ................................. 526/174; 526/175
[58] Field of Search ........................ 526/175, 181, 174
[56] References Cited

U.S. PATENT DOCUMENTS 3,644,313  2/1972  Cheng .................................. 526/175

Primary Examiner—Paul R. Michl
Attorney, Agent, or Firm—Alvin T. Rockhill

[57] ABSTRACT

It has been determined that metal salts of certain phenolic type antioxidants act as randomizers in the solution polymerization of conjugated diolefin monomers with copolymerizable vinyl aromatic monomers. These randomizers do not increase the vinyl content of polymers made in polymerizations which utilize them. These randomizers offer a special advantage in that they can be converted into antioxidants after polymerization has been completed in order to provide the polymer produced with stability against oxidation.

The present invention specifically relates to a process for preparing a rubbery substantially random copolymer which comprises polymerizing at least one conjugated diolefin monomer with at least one copolymerizable vinyl aromatic monomer in the presence of an organolithium initiator and a randomizing agent having the structural formula

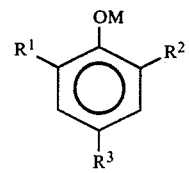

wherein M is a metal from Group I of the periodic system, and wherein $R^1$, $R^2$, and $R^3$ can be the same or different and are selected from alkyl groups, aryl groups, and tertiary-alkaryl groups, with the proviso that there is a collective total of at least 12 carbon atoms in $R^1$, $R^2$, and $R^3$.

20 Claims, No Drawings

RANDOMIZERS FOR USE IN SOLUTION POLYMERIZATIONS

BACKGROUND OF THE INVENTION

Copolymers of conjugated diolefin monomers and vinyl aromatic monomers tend to be blocky if they are prepared in a batch process without using a randomizing agent. Since a random distribution of repeat units which are derived from the conjugated diolefin monomer and the vinyl aromatic monomer is generally desirable, randomizing agents are very commonly utilized in the preparation of such polymers. Numerous randomizing agents which are commonly utilized in such polymerizations are disclosed in U.S. Pat. No. 4,311,803.

Many randomizing agents cause an increase in the vinyl content of the polymer being prepared. For this reason vinyl content and blockiness cannot be controlled independently with such randomizers. In situations where it is desirable to prepare a random copolymer without increasing vinyl content it is necessary to select a randomizer which does not increase vinylation or which only increases vinylation to a minimal extent. Tertiary-butyl potassium is a randomizing agent which causes increased vinylation which may be used commercially. However, the use of tertiary-butyl potassium presents a fire hazard due to its pyrophoric nature and it is not very soluble in the organic solvents commonly utilized as the medium for conducting such polymerizations.

SUMMARY OF THE INVENTION

It has been determined that metal salts of certain phenolic type antioxidants can be used as randomizers in preparing copolymers of conjugated diolefin monomers and copolymerizable vinyl aromatic monomers. These randomizers can be utilized without increasing vinylation to an appreciable extent. These randomizers are easy to prepare, exhibit good solubility in most organic solvents, and do not present a fire hazard. Such randomizers also offer an additional benefit in that they are capable of being converted to an antioxidant after the polymerization has been completed. They can therefore provide the random copolymer made with antioxidant stability.

The present invention specifically relates to a process for preparing a rubbery substantially random copolymer which comprises polymerizing at least one conjugated diolefin monomer with at least one copolymerizable vinyl aromatic monomer in the presence of an organolithium initiator and a randomizing agent having the structural formula:

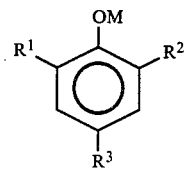

wherein M is a metal from Group I of the Periodic System, and wherein $R^1$, $R^2$, and $R^3$ can be the same or different and are selected from alkyl groups, aryl groups, and tertiary-alkaryl groups, with the proviso that there is a collective total of at least 12 carbon atoms in $R^1$, $R^2$, and $R^3$.

The present invention also reveals a process for preparing an oxidatively stable rubbery copolymer which is substantially random which comprises: (1) preparing a polymerization mixture which is comprised of (a) at least one conjugated diolefin monomer, (b) at least one copolymerizable vinyl aromatic monomer, (c) an organolithium initiator, (d) an organic solvent, and (e) a randomizing agent having the structural formula:

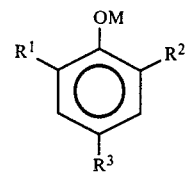

wherein M is a metal from Group I of the Periodic System, and wherein $R^1$, $R^2$, and $R^3$ can be the same or different and are selected from alkyl groups, aryl groups, and tertiary alkaryl groups, with the proviso that there is a collective total of at least 12 carbon atoms in $R^1$, $R^2$, and $R^3$; (2) allowing the conjugated diolefin monomers and the copolymerizable vinyl aromatic monomers to copolymerize to form a polymer solution which is comprised of the rubbery copolymer, said organic solvent, and said randomizing agent: and (3) adding an acid to the polymer solution to convert said randomizing agent into an antioxidant having the structural formula:

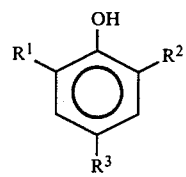

wherein $R^1$, $R^2$, and $R^3$ can be the same or different and are selected from alkyl groups, aryl groups, and tertiary-alkaryl groups, with the proviso that there is a collective total of at least 12 carbon atoms in $R^1$, $R^2$, and $R^3$.

DETAILED DESCRIPTION OF THE INVENTION

The polymers which can be prepared using the randomizers of the present invention are organolithium-initiated, solution-polymerized, substantially random conjugated diene/monovinyl aromatic compound copolymers. The conjugated diolefin monomers which are utilized in the synthesis of such polymers generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture. Feed stocks which are comprised of one or more conjugated diolefin monomers in admixture with other low molecular weight hydrocarbons can be utilized. Such admixtures, termed low concentration diene streams, are obtainable from a variety of refinery product streams, such as naptha-cracking operations or can be intentionally blended compositions. Some typical examples of low molecular weight hydrocarbons which can be admixed with 1,3-butadiene in the polymerization feed include propane, propylene, isobutane, n-butane, 1-butene, isobutylene, trans-2-butene, cis-2-butene, vinylacetylene, cyclohexane, ethylene, propylene, and the like.

The vinyl aromatic monomers used will be selected so as to be copolymerizable with the conjugated diolefin monomers. Generally, any vinyl aromatic monomer which is known to polymerize with organolithium initiators in solution polymerization systems can be used. Such vinyl aromatic monomers typically contain from 8 to 20 carbon atoms. Usually the vinyl aromatic monomer will contain from 8 to 14 carbon atoms. The most widely used vinyl aromatic monomer is styrene. Some examples of vinyl aromatic monomers that can be utilized include 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-(phenylbutyl)styrene, and the like.

The relative amount of conjugated diene or dienes and monovinyl aromatic compound or compounds employed can vary over a wide range. In preparing rubbery polymers, the proportion of the conjugated diene versus the monovinyl-substituted aromatic compound should be sufficient so as to result in a substantially rubbery or elastomeric copolymer product. There is no sharp break point as to the amount of conjugated diene versus monovinyl-substituted aromatic compound that confers rubbery or elastomeric properties on the resulting copolymer, though in general at least 50 parts by weight of conjugated diene are required on an exemplary basis. Thus, for a rubbery copolymer, as is preferred in accordance with this invention, the weight ratio of conjugated diene to monovinyl aromatic compound in the monomer charge would be in the range of about 50:50 to 95:5. Of course, mixtures of conjugated dienes as well as mixtures of monovinyl-substituted aromatic compounds can be utilized.

Organolithium initiators employed in the process of our invention include the monofunctional and multifunctional types known for solution polymerization of the monomers as described herein. The multifunctional organolithium initiators can be either specific organolithium compounds or can be multifunctional types which are not necessarily specific compounds but rather represent reproducible compositions of regulable functionality.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

Among the multifunctional initiators, again which are not necessarily specific compounds, are those prepared by reacting an organomonolithium compound with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized if desired, by adding a solubilizing monomer such as a conjugated diene or monovinyl aromatic compound, after reaction of the primary components. Alternatively, the reaction can be conducted in the presence of a minor amount of the solubilizing monomer. Relative amounts of organomonolithium compound and multivinylsilane or multivinylphosphine preferably should be in the range of about 0.33 to 4 mols of organomonolithium compound per mol of vinyl group present in the multivinylsilane or multivinylphosphine employed.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mol of organolithium compound. The amount of multivinylaromatic compound employed preferably should be in the range of 0.05 to 2 mols per mol of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of the three isomers, and other compounds such as the ethylstyrenes, also is quite satisfactory.

Other types of multifunctional initiators can be employed such as those prepared by contacting a sec- or tert-organomonolithium compound with 1,3-butadiene, in a ratio of such as about 2 to 4 mols of organomonolithium compound per mol of 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by $R(Li)_x$ wherein R represents a hydrocarbyl radical of such as 1 to 20 carbon atoms per R group, and x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The randomizing agents which can be used in accordance with the process of the present invention have the structure formula:

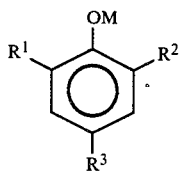

wherein M is a metal from Group I of the Periodic system, and wherein $R^1$, $R^2$, and $R^3$ can be the same or different and are selected from alkyl groups, aryl groups, and tertiary-alkaryl groups, with the proviso that there is a collective total of at least 12 carbon atoms in $R^1$, $R^2$, and $R^3$. In most cases M will represent sodium or potassium. Generally it is preferable for M to represent potassium. It is generally preferred for $R^1$ to be a tertiary-butyl group with $R^2$ and $R^3$ being tertiary groups containing at least 8 carbon atoms, such as tertiary-octyl groups. As a general rule $R^2$ and $R^3$ are selected from alkyl groups and alkaryl groups containing from 8 to 20 carbon atoms. The randomizing agent will normally not contain benzylic hydrogen atoms which are activated by two or more aromatic rings.

Some particularly preferred randomizers for use in the process of this invention can be made from Wingstay TM T and Wingstay TM C which are commercially available antioxidants that are sold by the Goodyear Tire & Rubber Company. The randomizer which can be made from Wingstay T has the idealized structural formula:

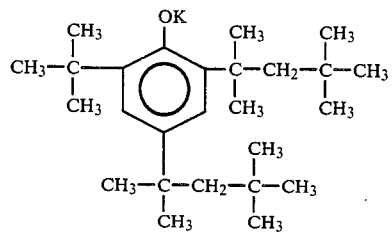

and the randomizer which can be made from Wingstay C has the idealized structural formula:

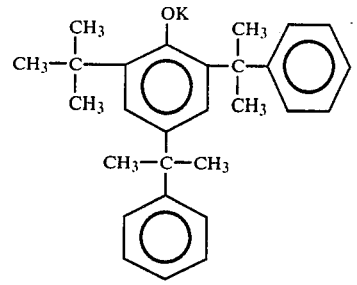

The amount of randomizer needed in order to produce a specific type of polymer will vary greatly and persons skilled in the art will be easily able to ascertain the amount needed in order to attain a specific desired result. As a general rule from about 0.01 to about 2.0 mols of the randomizer will be utilized per mol of organo lithium initiator utilized. In most cases it will be preferable to utilize from about 0.05 to about 0.4 mols of the randomizing agent per mol of the organolithium initiator employed.

The polymerization of the present invention will be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

The polymerization temperature utilized can vary over a broad range of from about $-20°$ C. to about $150°$ C. In most cases a temperature within the range of about $30°$ C. to about $125°$ C. will be utilized. Normally the randomizers of this invention are more effective at lower polymerization temperatures. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization can then be terminated using a standard technique. The polymerization can be terminated with a conventional noncoupling type of terminator, such as water, an acid, a lower alcohol, and the like or with a coupling agent.

Coupling agents can be used in order to improve the cold flow characteristics of the rubber and rolling resistance of tire rubber which is being synthesized. It also leads to better processability and other beneficial properties. A wide variety of compounds suitable for such purposes can be employed. Some representative examples of suitable coupling agents include: agents are the multivinylaromatic compounds, multiepoxides, multiisocyanates, multiimines, multialdehydes, multiketones, multihaldies, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3- divinylnaphthalene, 1,8-divinylnaphthalene, 1,3,5-trivinylnaphthalene, 2,4-divinylbiphenyl, and the like. The divinylaromatic hydrocarbons are preferred, particularly divinylbenzene in either its ortho, meta, or para isomer. Commercial divinylbenzene which is a mixture of the three isomers and other compounds is quite satisfactory.

While any multiepoxide can be used, we prefer those which are liquid since they are more readily handled and form a relatively small nucleus for the radial polymer. Especially preferred among the multiepoxides are the epoxidized hydrocarbon polymers such as epoxidized liquid polybutadiene and the epoxidized vegetable oils such as epoxidized soybean oil and epoxidized linseed oil. Other epoxy compounds such as 1,2,5,6,9,10-triepoxydecane, and the like, also can be used.

Examples of suitable multiisocyanates include benzene-1,2,4-triisocyanate, naphthalene-1,2,5,7-tetraisocyanate, and the like. Especially suitable is a commercially available product known as PAPI-1, a polyarylpolyisocyanate having an average of 3 isocyanate groups per molecule and an average molecular weight of about 380. Such a compound can be visualized as a series of isocyanate-substituted benzene rings joined through methylene linkages.

The multiimines, which are also known as multiaziridinyl compounds, preferably are those containing 3 or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide, and the like.

The multialdehydes are represented by compounds such as 1,4,7-naphthalene tricarboxyaldehyde, 1,7,9-anthracene tricarboxyaldehyde, 1,1,5-pentane tricarboxyaldehyde, and similar multialdehyde-containing aliphatic and aromatic compounds.

The multiketones can be represented by compounds such as 1,4,9,10-anthraceneterone, 2,3-diacetonylcyclohexanone, and the like.

Examples of the multianhydrides include pyromellitic dianhydride, styrene-maleic anhydride copolymers, and the like.

Examples of the multiesters include diethyladipate, triethylcitrate, 1,3,5-tricarbethoxybenzene, and the like.

Among the multihalides, we presently prefer the silicon tetrahalides such as silicon tetrachloride, silicon tetrabromide, and silicon tetraiodide, and the trihalosilanes such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione, and the like.

In addition to the silicon multihalides as described hereinabove, other metal multihalides, particularly those of tin, lead, or germanium, also can be readily employed as coupling and branching agents.

Difunctional counterparts of these agents also can be employed, whereby a linear polymer rather than a branched polymer results.

Broadly, and exemplarily, a range of about 0.01 to 4.5 milliequivalents of coupling agent are employed per 100 grams of monomer, presently preferred about 0.01 to 1.5 to obtain the desired Mooney viscosity. The larger quantities tend to result in production of polymers containing terminally reactive groups or insufficient coupling. One equivalent of treating agent per equivalent of lithium is considered optimum amount for maximum branching, if this result is desired in the production line. The coupling agent can be added in hydrocarbon solution, e.g., in cyclohexane, to the polymerization admixture in the final reactor with suitable mixing for distribution and reaction.

After the polymerization has been terminated the randomizer can be converted into an antioxidant in order to make the rubber which was synthesized oxidatively stable. The randomizing agent can be converted to an antioxidant by simply treating it with an acid. This is normally accomplished by adding a sufficient amount of the acid to the polymer solution containing the rubbery copolymer, the organic solvent, and the randomizing agent to cause a reaction which replaces the metal in the randomizing agent with a hydrogen atom. This reaction is illustrated as follows:

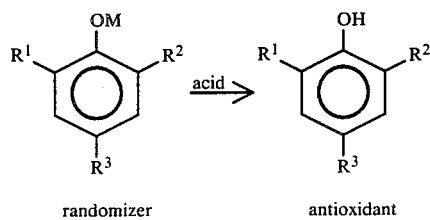

randomizer        antioxidant

Normally, the antioxidant will be generated if the pH of the polymer solution is adjusted to less than about 3. Any organic or inorganic acid with a pK value of less than about 8 can be used. Some representatives examples of suitable acids include: acetic acid, hydrochloric acid, formic acid, phosphoric acid, and the like.

The polymer solution can be treated to destroy residual carbon-lithium bonds which may be present and to recover the synthetic rubber. It may also be desirable to add additional antioxidants to the polymer solution in order to further protect the rubber from potentially deleterious effects of contact with oxygen. The rubber can be precipitated from the polymer solution and any remaining lithium moieties can be inactivated by the addition of lower alcohols, such as isopropyl alcohol, to the polymer solution. The rubber can be recovered from the solvent and residue by means such as decantation, filtration, centrification, and the like. Steam stripping can also be utilized in order to remove volatile organic compounds.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

A commercially available antioxidant (Wingstay T) having the structural formula

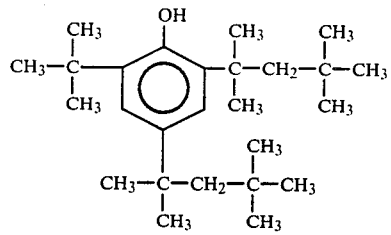

was converted to a randomizing agent by treating it with an excess of potassium hydroxide in a xylene solution which was refluxed at 135° C. The water which was produced as a by product in the reaction of the potassium hydroxide with the antioxidant was removed by azeotropic distillation utilizing a Dean-Stark trap. The randomizing agent which was recovered had the structural formula

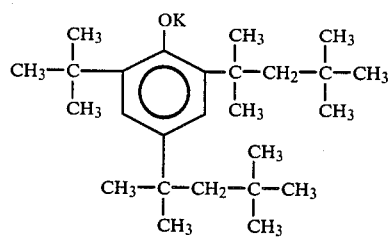

The randomizing agent made was then utilized to randomize a copolymerization of 1,3-butadiene and styrene.

A solution containing 225 g of 1,3-butadiene, 75 g of styrene, and 1700 g of hexane was passed through silica gel and added to a Chemco one gallon (3.79) glass reactor under a nitrogen atmosphere. The polymerization was catalyzed by adding 5 ml of a 1 molar solution of secondary butyl lithium in hexane (5 millimoles of catalyst) and was conducted at 50° C. The polymerization was randomized by adding 2 ml of a 0.2 molar solution of the randomizing agent in xylene. The molar ratio of the randomizing agent to the butyl lithium catalyst was 0.12:1. The polymerization was continued until a constant solids content was reached after about 4 to 6 hours. The monomer charge utilized in the polymerization consisted of 25 mole percent styrene and 75 mole percent 1,3-butadiene.

The degree of randomization was determined at a conversion of 10% and at 100% conversion by nuclear magnetic resonance spectrometry. It was determined that the polymer contained 21% styrene at a conversion of 10% and 21% styrene at a conversion of 100%. This clearly shows that the randomizer worked exceptionally well. It was also determined that the polymer produced had a vinyl content of about 18%. It was previously determined that if unmodified with a randomizer, such a polymerization would result in the incorporation of only 3% styrene at a 10% conversion with an incorporation of 25% styrene at a conversion of 100%.

EXAMPLE 2

The procedure utilized in Example 1 was repeated in this experiment except that the ratio of randomizer to the organolithium initiator was 0.06:1. In this experiment it was determined that 11% styrene was incorporated into the polymer at a conversion of 10% with 22% styrene being incorporated into the polymer at 100% conversion. The amount of randomizer utilized in this experiment did not result in the formation of a perfectly random copolymer. However, the styrene-butadiene copolymer produced was certainly much more random than if it would have been made without using a randomizing agent.

EXAMPLE 3

The procedure utilized in Example 1 was repeated in this experiment except that Wingstay C was utilized in place of Wingstay T and that the molar ratio of randomizer to the organolithium initiator was 0.24:1. In this experiment it was determined that 19% styrene was incorporated into the polymer at a conversion of 10% with 16% styrene being incorporated into the polymer at 100% conversion. This experiment clearly shows that the potassium salt of Wingstay C works very well as a randomizer.

EXAMPLE 4

The procedure utilized in Example 3 was repeated in this experiment except that the molar ratio of randomizer to the organolithium initiator was 0.17:1. It was determined that 16% styrene was incorporated into the polymer at a conversion of 10% and that 19% styrene was incorporated into the polymer at a conversion of 100%.

While certain representative embodiments and details have been shown for the purpose of illustrating the present invention, it will be apparent to those skilled in this art that various changes and modifications can be made therein without departing from the scope of the invention.

What is claimed is:

1. A process for preparing a rubbery substantially random copolymer which comprises polymerizing at least one conjugated diolefin monomer with at least one copolymerizable vinyl aromatic monomer in the presence of an organolithium initiator and a randomizing agent having the structural formula:

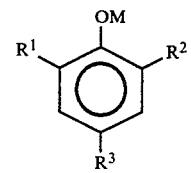

wherein M is a metal from Group I of the Periodic System, and wherein $R^1$, $R^2$, and $R^3$ can be the same or different and are selected from alkyl groups, aryl groups, and tertiary alkaryl groups, with the proviso that there is a collective total of at least 12 carbon atoms in $R^1$, $R^2$, and $R^3$.

2. A process as specified in claim 1 further comprising treating the randomizing agent with an acid after the polymerization is substantially completed in order to produce an antioxidant having the structural formula

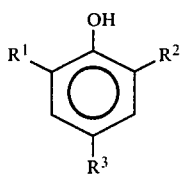

wherein $R^1$, $R^2$, and $R^3$ can be the same or different and are selected from alkyl groups, aryl groups, and tertiary-alkaryl groups, with the proviso that there is a collective total of at least 12 carron atoms in $R^1$, $R^2$, and $R^3$.

3. A process for preparing an oxidatively stable rubbery copolymer which is substantially random which comprises: (1) preparing a polymerization mixture which is comprised of (a) at least one conjugated diolefin monomer, (b) at least one copolymerizable vinyl aromatic monomer, (c) an organolithium initiator, (d) an organic solvent, and (e) a randomizing agent having the structural formula

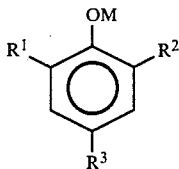

wherein M is a metal from Group I of the Periodic System, and wherein $R^1$, $R^2$, $R^3$ can be the same or different and are selected from alkyl groups, aryl groups, and tertiary-alkaryl groups, with the proviso that there is a collective total of at least 12 carbon atoms in $R^1$, $R^2$, $R^3$; (2) allowing the conjugated diolefin monomers and the copolymerizable vinyl aromatic monomers to copolymerize to form a polymer solution which is comprised of the rubber copolymer, said organic solvent, and said randomizing agent; and (3) adding an acid to the polymer solution to convert said randomizing agent into an antioxidant having the structural formula

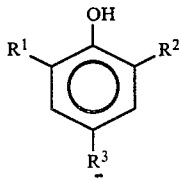

wherein $R^1$, $R^2$, and $R^3$ can be the same or different and are selected from alkyl groups, aryl groups, and alkaryl groups, with the proviso that there is a collective total of at least 12 carbon atoms in $R^1$, $R^2$, $R^3$.

4. A process as specified in claim 1 wherein said randomizing agent has the structural formula

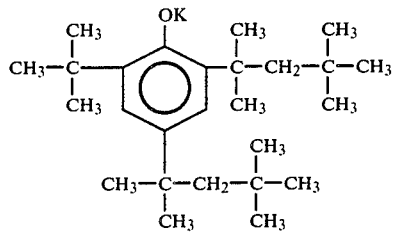

5. A process as specified in claim 1 wherein from about 0.01 to about 2.0 moles of the randomizing agent is present per mole of the organolithium initiator present.

6. A process as specified in claim 5 wherein M is selected from the group consisting of sodium and potassium.

7. A process as specified in claim 6 wherein $R^1$ is a tertiary-butyl group and wherein $R^2$ and $R^3$ are tertiary groups containing at least 8 carbon atoms.

8. A process as specified in claim 7 wherein $R^2$ and $R^3$ contain from 8 to 20 carbon atoms.

9. A process as specified in claim 8 wherein M is potassium.

10. A process as specified in claim 9 wherein from about 0.05 to about 0.4 moles of the randomizing agent is present per mole of the organolithium initiator present.

11. A process as specified in claim 10 wherein at least one conjugated diolefin monomer is 1,3-butadiene and wherein at least one copolymerizable vinyl aromatic monomer is styrene.

12. A process as specified in claim 11 wherein the polymerization is conducted at a temperature within the range of about 30° to about 125° C.

13. A process as specified in claim 12 wherein said organilithium initiator is butyl lithium.

14. A process as specified in claim 13 wherein $R^2$ and $R^3$ are tertiary-octyl groups.

15. A process as specified in claim 3 wherein from about 0.01 to about 2.0 moles of the randomizing agent is present per mole of the organolithium initiator present; wherein M is selected from the group consisting of sodium and potassium: wherein the conjugated diolefin monomers contain from 4 to 8 carbon atoms; wherein the vinyl aromatic monomers contain from 8 to 14 carbon atoms; and wherein the polymerization is conducted at a temperature within the range of about −20° to about 150° C.

16. A process as specified in claim 15 wherein said acid has a pK value of less than about 8.

17. A process as specified in claim 16 wherein $R^1$ is a tertiary-butyl group; wherein $R^2$ and $R^3$ are tertiary groups containing at least 8 carbon atoms; wherein said conjugated diolefin monomers are selected from the group consisting of 1,3-butadiene and isoprene; and wherein said polymerization is conducted at a temperature within the range of about 30° to about 125° C.

18. A process as specified in claim 17 wherein from about 0.05 to about 0.4 moles of the randomizing agent is present per mole of the organolithium initiator present; wherein M is potassium; wherein $R^2$ and $R^3$ contain from 8 to 20 carbon atoms; and wherein said copolymerizable vinyl aromatic monomer is styrene.

19. A process as specified in Claim 18 wherein said organolithium initiator has the structured formula $R(Li)_x$, wherein R represents a hydrocarbyl radical containing from 1 to 20 carbon atoms and wherein x is an integer of 1 to 4.

20. A process as specified in claim 19 wherein a sufficient amount of acid is added to adjust the pH of the polymer solution to less than about 3; wherein the conjugated diolefin monomer is 1,3-butadiene; and wherein said organolithium initiator is butyl lithium.

* * * * *